No. 674,909. Patented May 28, 1901.
A. DROITCOURT.
COMBINED COTTON SEED AND CORN PLANTER.
(Application filed Nov. 14, 1900.)
(No Model.) 2 Sheets—Sheet 1.
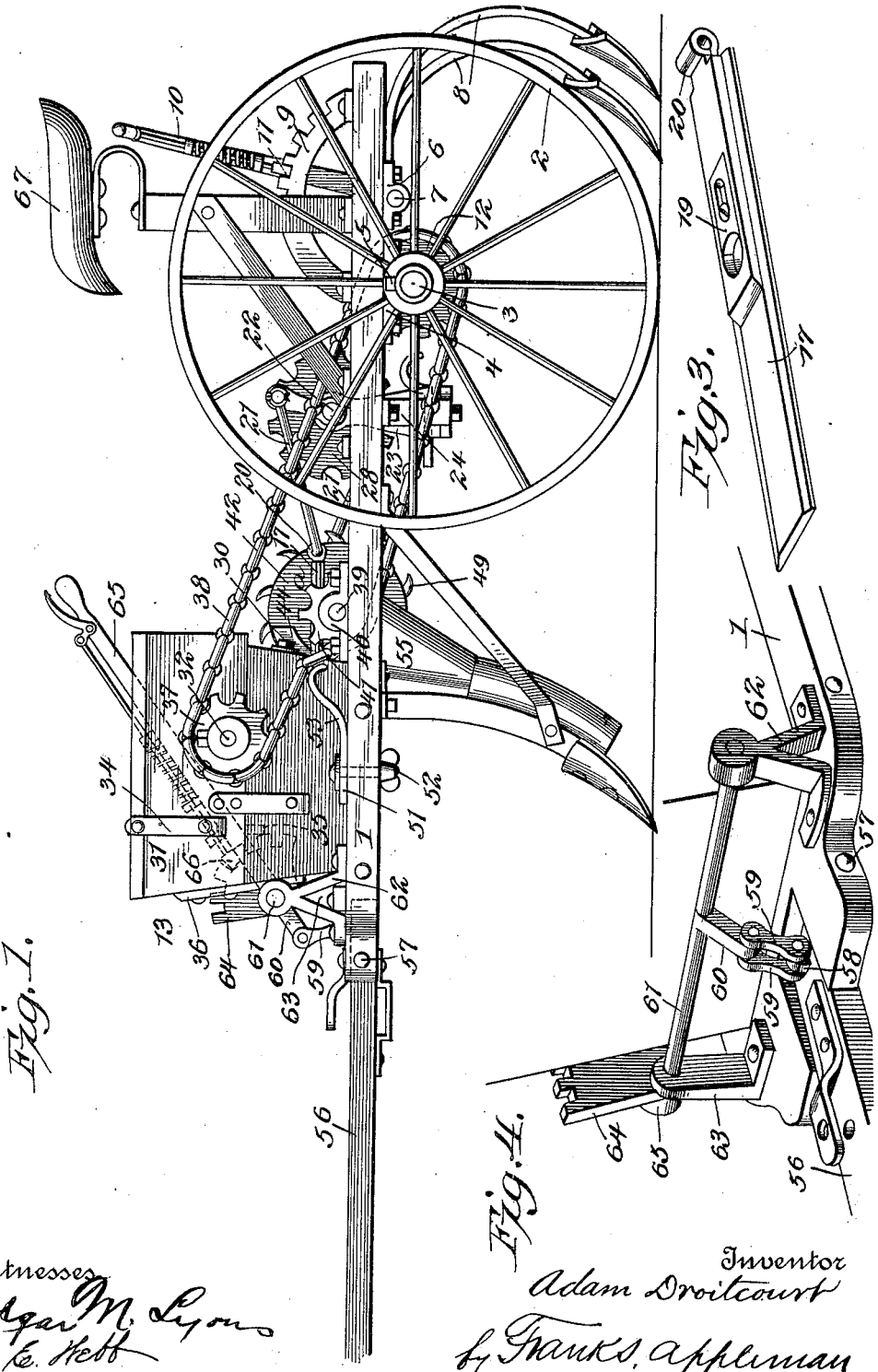
Witnesses
Edgar M. Lyons
C. E. Webb
Inventor
Adam Droitcourt
by Frank S. Appleman
Attorney No. 674,909. Patented May 28, 1901.
A. DROITCOURT.
COMBINED COTTON SEED AND CORN PLANTER.
(Application filed Nov. 14, 1900.)
(No Model.)
2 Sheets—Sheet 2.
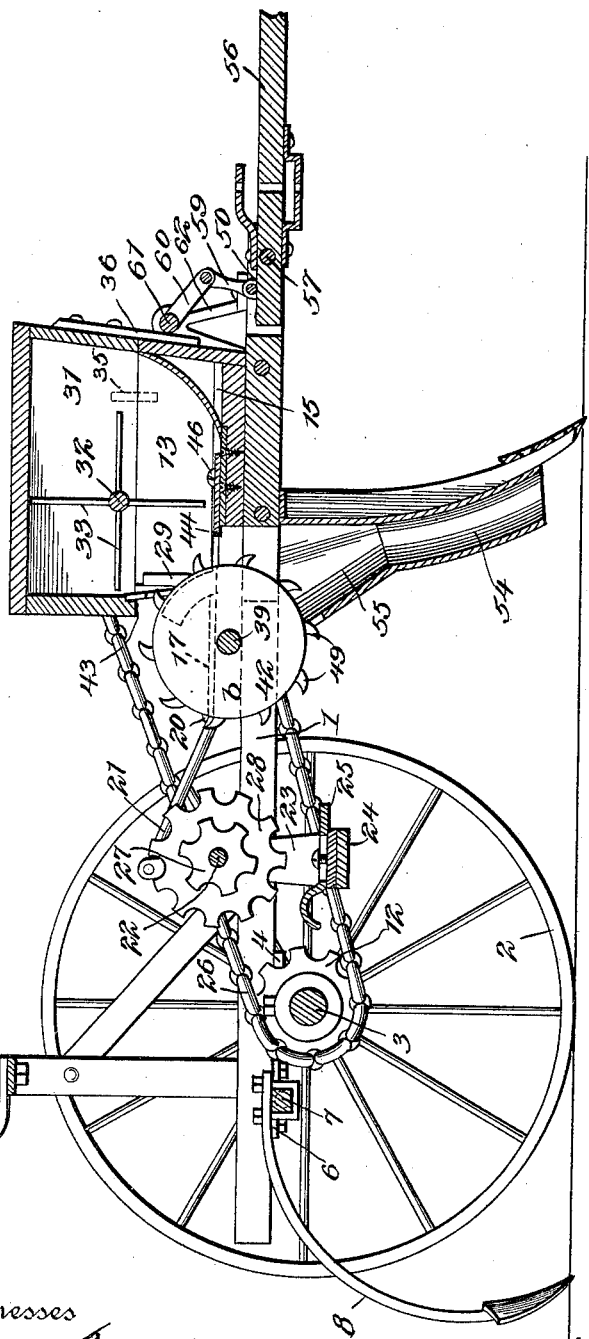
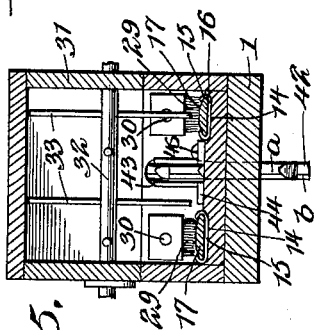
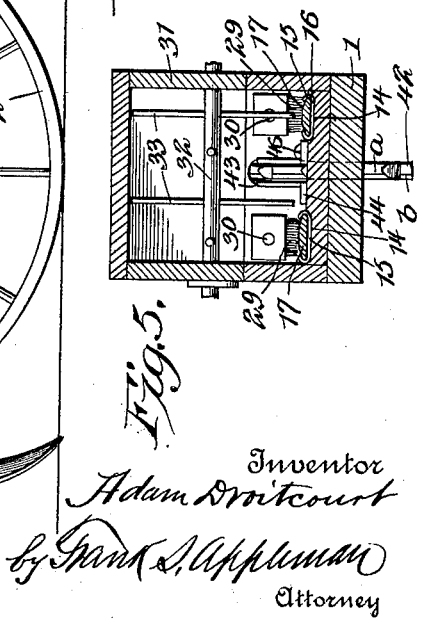
Witnesses
Edgar M. Lyons
C. E. Webb
Inventor
Adam Droitcourt
by Frank S. Appleman
Attorney

UNITED STATES PATENT OFFICE.

ADAM DROITCOURT, OF CASTROVILLE, TEXAS.

COMBINED COTTON-SEED AND CORN PLANTER.

SPECIFICATION forming part of Letters Patent No. 674,909, dated May 28, 1901.

Application filed November 14, 1900. Serial No. 36,533. (No model.)

*To all whom it may concern:*

Be it known that I, ADAM DROITCOURT, a citizen of the United States of America, residing at Castroville, in the county of Medina and State of Texas, have invented certain new and useful Improvements in a Combined Cotton-Seed and Corn Planter, of which the following is a specification, reference being had therein to the accompanying drawings.

This invention relates to seeders and planters, and particularly to that class known as "combined cotton and corn planters."

The objects of the invention are to provide a truck having operating mechanism changeable to either cotton or corn seeders and in combination therewith a hopper formed in sections, one of which is removable; second, to provide an interchangeable upper section having journaled therein stirrers or feeders of different construction designed particularly for feeding or stirring the cotton-seed or corn, as the case may be; third, to provide a tongue-regulating mechanism whereby the angle at which the tongue is held may regulate the depth of the furrow-shovel; fourth, to produce, in combination with a hopper and the operating mechanism, a feeding-wheel having detachable teeth of novel structure, and, fifth, to produce, in combination with the hopper and operating mechanism, apertured slides and means for regulating the size of the apertures in said slides for the discharge of corn to be planted.

Finally, the object of the invention is to produce a seeder and planter which will possess advantages in points of simplicity, efficiency, and inexpensive structure.

With the above and other objects in view the invention consists in the details of construction and the arrangement and combination of parts to be hereinafter more fully set forth and claimed.

In describing the invention in detail reference will be had to the accompanying drawings, forming a part of this specification, wherein like characters denote corresponding parts in the several views, and in which—

Figure 1 is a view in elevation of the planter geared for the distribution of the cotton-seed. Fig. 2 is a central longitudinal sectional view. Fig. 3 is a detail view in perspective of one of the corn-distributing slides. Fig. 4 is a view in elevation, showing tongue operating and regulating mechanism. Fig. 5 is a sectional view of the hopper, taken centrally of one of the corn-distributing slides.

In the drawings, 1 indicates the frame, and 2 the rear wheels, supporting the frame, said wheels being mounted on a shaft or axle 3, which is rotatable in the bearings 4, depending from the frame. The wheels are secured to the shaft by set-screws 5, threaded in the hub of the wheel. Near the rear of the frame and journaled in the bearings 6, depending from the under side thereof, is a rock-shaft 7. Arms 8 are secured to the rock-shaft and terminate in shovels for closing the furrow formed by the furrow-opener, to be hereinafter described. A segmental rack 9 is secured to the frame, and a lever 10, secured to the rock-shaft, is provided with a spring-pressed detent 11, engaging teeth or recesses of the segmental rack 9 for holding the shovels in an elevated or lowered position.

Mounted on the shaft 3 and adjusted thereon is a sprocket-wheel 12, which takes motion from said shaft. The hopper 13 is fixed to the frame, and its bottom is provided with longitudinal openings 14 in each side, and seated in said openings are the guides 15, having upturned edges to form V-shaped ways 16, in which the edges of the slides 17 reciprocate. The slides 17 are provided with apertures for the reception of one or more grains of corn, the number of grains accommodated being regulated by the slide 19. The rear ends of the slides are provided with eyes 20 to receive angular ends of the pitmen 21, said pitmen being journaled at their opposite ends on the cranks of the crank-shaft 22. The crank-shaft is journaled in bearings formed with the bracket 23, and the bracket in turn is supported by beam 24, extending between sides of the frame. The bracket is also provided with a sliding plate 25, having a curved rear end forming a bearing for the sprocket-chain 26, as it is driven by the sprocket 12, when set in longitudinal center of the shaft 3, said plate being designed for purpose of taking up slack chain when said chain is adjusted to the sprocket 27, mounted on crank-shaft 22. The sprocket 28, which is also mounted on the crank-shaft 22, is of greater diameter than the sprocket 27, this being for the purpose of permitting the mechanism to be adjusted to reciprocate the slides at a greater or less frequency, according to the requirements.

Secured to the rear wall of the hopper on the inside are the brushes 29, having bolts 30, which travel in slots in the rear wall for the purpose of adjusting the said brushes with relation to the slide, and the brushes are provided for purpose of removing surplus grains of corn as the slide passes thereunder to the exterior of the hopper.

In order to adapt this machine for distribution of cotton-seed, I provide a supplemental extension 31 for the hopper, and in this I journal a shaft 32, carrying stirring-fingers 33, said extension being secured in place by the spring-clips 34, attached thereto and engaging stud 35 on the hopper proper. As there is more or less strain on the extension by reason of the connection of the driving mechanism, to be hereinafter described, with the shaft 32, I provide on the front face of the extension the plates 36, which extend below the lower edge of the extension and engage the stationary section of the hopper. The shaft 32 has mounted thereon a sprocket-wheel 37, driven by a sprocket-chain 38, taking motion from the sprocket 12, which is set near one side of the frame when the cotton-planting attachment is to be employed. This connection is designed for the operation of the fingers through the medium of the shaft 32. A shaft 39 is mounted in bearings 40, stationed on the upper surface of the frame, said shaft being driven by the sprocket-chain 38, engaging the sprocket-wheel 41 thereon. The cotton-seed-feeding wheel 42 is mounted centrally of said shaft and rotates through a slot 43, cut centrally in the rear side and bottom of the hopper. A gage-plate 44 is slidable on the bottom for the purpose of regulating the quantity of seed forced out by the feeding-wheel, said plate being provided with a slot 45 and a set-screw 46 that it may be held in any degree of adjustment. The feeding-wheel is composed of two disks a b, the former having L-shaped recesses extending inwardly from the periphery for the reception of the shanks 48 of the teeth 49, and the disk b has its periphery fitting against the shoulder 50 of the teeth for the purpose of bracing and giving strength to the combination. According to the number of teeth carried by the disk the feed of the seed will be regulated. For instance, if the teeth are equidistantly spaced and of short interval the cotton-seed will be fed through the gage-plate in rapid succession, while if the disk has but two or four teeth the cotton-seed will be fed through the gage-plate in bunches equidistantly spaced. A plate 51 is provided with a slot, and a bolt 52 is passed through the slot into the frame, retaining the plate in place at a varying degree of adjustment. This plate is provided with an arm 53, terminating in a curved end over which the sprocket-chain will ride, and this arm and plate are provided for the purpose of taking up the slack and loose chain when required.

When the extension of the hopper is dispensed with, the cover of the extension is removed and applied to the hopper proper through the medium of the strap and stud, as shown.

The furrow-opening shovel is suitably suspended from the frame, and the tube 54, having a flared upper end 55 for the reception of the seed, terminates and discharges just back of the shovel, so that as the furrow is opened the seed is deposited on the moist ground, and if any of the dirt displaced by the shovel falls back in the furrow the seed will have been deposited before such return of the dirt takes place.

The tongue 56 is pivoted to the frame on the bolt 57 and is provided at its rear end with an eye 58, in which is pivoted the links 59, said links having their upper ends pivotally connected to an arm 60 of the rock-shaft 61, said rock-shaft being mounted in brackets 62 and 63, the latter of which is provided with a segmental rack 64. An operating-lever 65 is mounted on the rock-shaft and carries a spring-pressed detent 66, engaging the segmental rack for retaining the rock-shaft in varying degrees of adjustment. According to the position of the rock-shaft the position of the tongue will be regulated, and through this means the depth of the furrow formed by the shovel may be regulated. It will be seen from the drawings that this operating-lever and the lever for operating the rear rock-shaft are within reach of the seat 67, which is suitably supported near the rear of the frame.

The construction, operation, and advantages will, it is thought, be understood from the foregoing description, it being noted that various changes may be made in the details of construction for successfully carrying the invention into practice without departing from the scope of the claims.

Having fully described the invention, what I claim as new, and desire to secure by Letters Patent, is—

1. In a convertible planter, a hopper having a recessed bottom, slideways seated in the recesses, slides in the ways having holes and means for graduating the holes, a cotton-seed-feeding wheel having teeth projecting into the hopper, an adjustable plate on the bottom of hopper operating in conjunction with the feed-wheel; means whereby the discharge of the cotton-seed is controlled and suitable mechanism for actuating the parts.

2. In a convertible planter, a hopper having recesses formed in the bottom, guideways in the recesses consisting of plates having inturned edges, slides having holes for the discharge of corn, means for graduating the size of the holes in the slides, a plate adjustable on the bottom of the hopper and having upwardly-extending ears, a feed-wheel journaled between the ears, adjusting means whereby the plate may be set to close the cotton-seed exit, a supplemental top for the hopper, a stirrer carried thereby, and a suitable gearing whereby the corn or cotton-seed attachment may be driven from the power-shaft, substantially as described.

In testimony whereof I affix my signature in the presence of two witnesses.

ADAM DROITCOURT.

Witnesses:
JOHN G. HALL,
LOUIS MANGOLD.